(12) United States Patent
Good et al.

(10) Patent No.: US 7,938,661 B2
(45) Date of Patent: May 10, 2011

(54) PHOTOVOLTAIC MODULE CONNECTOR ASSEMBLY

(75) Inventors: Robert Scott Good, Camp Hill, PA (US); Alan R. MacDougall, Beaverton, OR (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/556,305

(22) Filed: Sep. 9, 2009

(65) Prior Publication Data

US 2010/0105245 A1  Apr. 29, 2010

Related U.S. Application Data

(63) Continuation-in-part of application No. 12/260,658, filed on Oct. 29, 2008.

(51) Int. Cl.
*H01R 13/52* (2006.01)
(52) U.S. Cl. ......................................... 439/271; 439/589
(58) Field of Classification Search ................ 439/529, 439/271, 589; 136/243, 521
See application file for complete search history.

(56) References Cited

U.S. PATENT DOCUMENTS

| | | | | |
|---|---|---|---|---|
| 4,703,161 A * | 10/1987 | McLean | ......................... | 235/1 D |
| 4,768,971 A * | 9/1988 | Simpson | ........................ | 439/329 |
| 4,952,160 A * | 8/1990 | Olsen | ........................... | 439/142 |
| 5,051,366 A * | 9/1991 | Anderson et al. | ............... | 436/67 |
| 5,730,619 A * | 3/1998 | Hamlin | ......................... | 439/493 |
| 7,369,398 B2 * | 5/2008 | Higashikozono et al. | ..... | 361/641 |
| 7,645,154 B2 * | 1/2010 | Baker et al. | ................... | 439/271 |
| 7,648,371 B2 * | 1/2010 | Boensch et al. | .............. | 439/76.1 |
| 7,686,644 B2 * | 3/2010 | Chu et al. | ....................... | 439/500 |
| 2005/0022859 A1 * | 2/2005 | Nass et al. | ..................... | 136/251 |
| 2008/0236886 A1 * | 10/2008 | Gerull et al. | .................. | 174/535 |
| 2010/0218797 A1 * | 9/2010 | Coyle et al. | ................... | 136/243 |

* cited by examiner

*Primary Examiner* — Hae Moon Hyeon

(57) ABSTRACT

A connector assembly includes a housing, a contact, a support plate, and posts. The housing extends between a mounting side and an opposite side. The mounting side is configured to be mounted to a first side of a photovoltaic module. The contact is held by the housing and is configured to be electrically coupled with the photovoltaic module. The support plate is configured to be mounted to a second side of the photovoltaic module. The posts are coupled with at least one of the housing and the support plate and extend through an opening in the photovoltaic module that extends therethrough and joined with the other of the housing and the support plate. The posts secure the housing to the photovoltaic module.

20 Claims, 5 Drawing Sheets

PHOTOVOLTAIC MODULE CONNECTOR ASSEMBLY

CROSS-REFERENCE TO RELATED APPLICATIONS

This application is a continuation-in-part of co-pending U.S. patent application Ser. No. 12/260,658, filed Oct. 29, 2008, and entitled "Solar Laminate Connector" (the "'658 Application"). The entire disclosure of the '658 Application is hereby incorporated by reference herein in its entirety.

BACKGROUND OF THE INVENTION

The subject matter herein relates generally to photovoltaic (PV) systems, and more particularly, to connector assemblies for PV modules.

PV modules or panels convert incident light into electricity. Known PV modules receive light and convert the light into an electrical potential difference. The electrical potential difference is applied to module contacts positioned at or near an exterior surface of the PV module. An electrical connector is electrically coupled to the module contacts to receive the potential difference. The potential differences of the PV modules may be combined as an electric potential and/or current passing through several of the connectors and modules. The electric potential and/or current may then be applied to an electric load that uses the potential and/or current generated by the solar modules to perform one or more operations or actions.

Electrical connectors are mounted to the PV modules to electrically couple the connectors with the PV modules. The connectors may be referred to as junction boxes. In order to electrically couple the connectors with the PV module, a bus bar ribbon or other contact may extend from the solar module and be affixed to contacts in the connectors. Some known connectors affix the bus bar ribbons to the contacts using solder. For example, solder balls may be applied to the contacts between the contacts and the bus bar ribbon. The solder balls are then heated to reflow the solder to secure the contacts and bus bar with one another and to provide an electrically communicative pathway between the contacts and the bus bar. The solder that is used in some known connectors is manually applied. The manual application of the solder may result in incorrect placement of the solder. For example, the solder may not be placed in a position to couple the bus bar to the contacts.

Some of the connectors or junction boxes are mounted to one side of the PV module using an adhesive. The connectors may become dislodged from the PV modules and electrically decoupled from the PV modules. For example, over time, the adhesive between the connectors and PV modules may weaken due to environmental conditions and changes, movement and flexing of the PV modules relative to the connectors, and the like.

The interface between some known connectors and the PV modules to which the connectors are mounted may permit ingress of contaminants into the space between the connectors and the PV modules. For example, gaps and/or voids between the connectors and the PV modules may provide open volumes through which moisture may travel into the connectors. The moisture may reach and short circuit the contacts of the connectors.

Therefore, a need exists for connectors used in connection with PV modules that meet or resolve one or more of the shortcomings set forth above.

BRIEF DESCRIPTION OF THE INVENTION

In one embodiment, a connector assembly is provided that includes a housing, a contact, a support plate, and a post. The housing extends between a mounting side and an opposite side. The mounting side is configured to be mounted to a first side of a photovoltaic module. The contact is held by the housing and is configured to be electrically coupled with the photovoltaic module. The support plate is configured to be mounted to a second side of the photovoltaic module. The post is coupled with at least one of the housing and the support plate and extends through an opening in the photovoltaic module that extends therethrough and joined with the other of the housing and the support plate. The post secures the housing to the photovoltaic module.

In another embodiment, another connector assembly is provided. The connector assembly includes a housing, a cable, and a contact. The housing extends between a mounting side and an opposite side. The mounting side is configured to be mounted to a photovoltaic module. The housing includes a contact window that frames an opening extending through the housing from the mounting side to the opposite side. The cable is coupled with the housing and includes a conductor capable of transferring electric potential and/or current generated by the photovoltaic module. The contact is joined with the housing and protrudes into the contact window. The contact is electrically coupled with the conductor of the cable and has opposite sides with a connection opening extending therethrough. The contact electrically couples the photovoltaic module with the cable when a conductive body is loaded into the connection opening of the contact.

In another embodiment, another connector assembly is provided. The connector assembly includes a housing, a contact, and an elastomeric gasket. The housing extends between a mounting side and an opposite side. The mounting side is surrounded by an outer edge and is configured to be mounted to a photovoltaic module. The contact is joined with the housing and is configured to be electrically coupled with the photovoltaic module. The gasket has a planar body with an outer edge disposed between the mounting side of the housing and the photovoltaic module. The outer edge of the gasket is approximately coextensive with the outer edge of the mounting side of the housing.

DETAILED DESCRIPTION OF THE INVENTION

Figure 1:
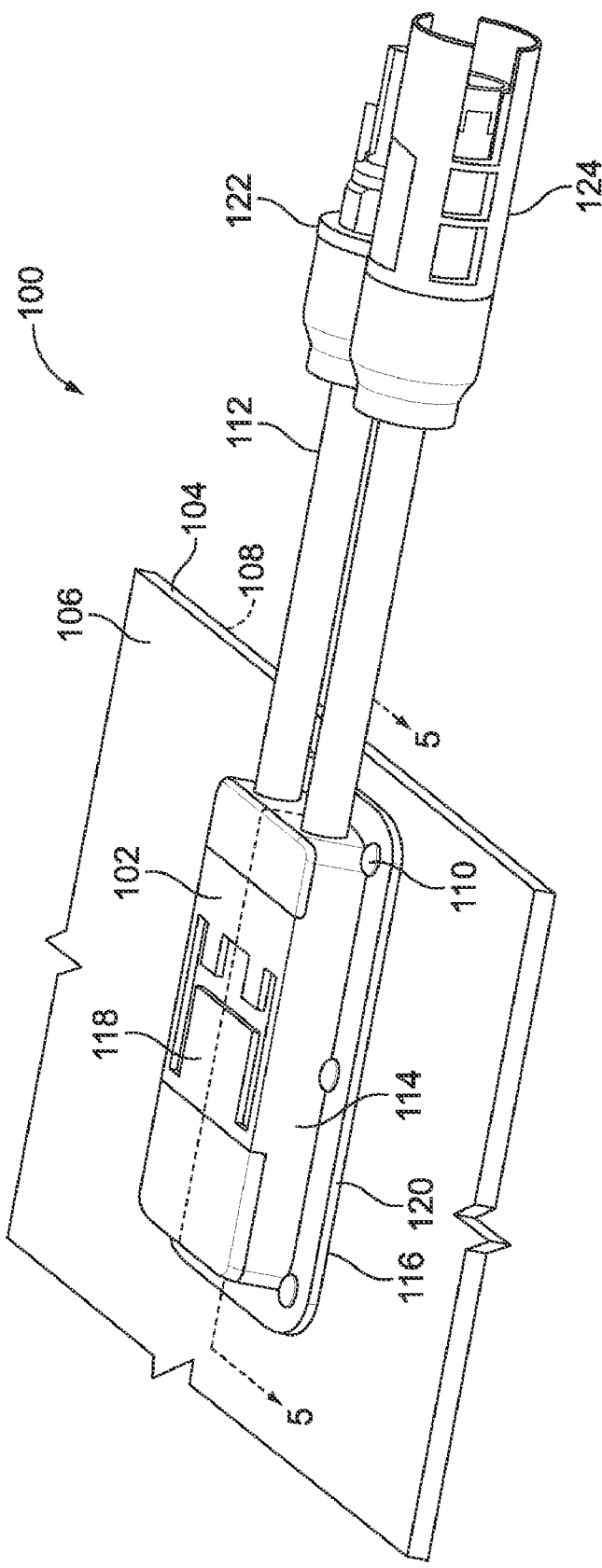
FIG. 1 is a partial perspective view of a photovoltaic (PV) connector system in accordance with one embodiment of the present disclosure.

FIG. 1 is a partial perspective view of a photovoltaic (PV) connector system 100 in accordance with one embodiment of the present disclosure. While various embodiments shown and disclosed herein are described in terms of a PV module 104 and a PV junction box connector assembly 102, one or more embodiments may alternatively be used in connection with a non-PV connector system. All embodiments described herein should not be exclusively limited to the field of PV modules and PV junction box connector assemblies.

The system 100 includes a PV junction box connector assembly 102 mounted to a PV module, panel or flexible laminate 104. The PV module 104 includes opposite sides 106, 108, at least one of which receives incident light. The PV module 104 converts the light into electric potential and/or current. The connector assembly 102 is electrically coupled with the PV module 104 so that the electric potential and/or current generated by the PV module 104 may be transmitted to the connector assembly 102. As described below, the connector assembly 102 includes one or more contacts 506 (shown in FIG. 5) that are electrically joined with the PV module 104 to provide an electrically communicative pathway between the PV module 104 and the connector assembly 102 for the transfer of the electric potential and/or current.

The connector assembly 102 includes a housing 114 that is mounted to the side 106 of the PV module 104 and a support plate 216 (shown in FIG. 2) that is mounted to the opposite side 108 of the PV module 104. The support plate 216 may be similar to the molded cover referred to as the molded cover 80 in the '658 Application. In the illustrated embodiment, several posts 110 extend from the support plate 216 through corresponding openings 214 (shown in FIG. 2) in the PV module 104. The posts 110 protrude through the openings 214 in the PV module 104 and extend through openings 208 (shown in FIG. 2) in the housing 114. The posts 110 engage the housing 114 and the support plate 216 such that the PV module 104 is sandwiched between the housing 114 and the support plate 216. The engagement between the posts 110, the housing 114 and the support plate 216 secures the connector assembly 102 to the PV module 104 and may prevent removal of the connector assembly 102 from the PV module 104.

The housing 114 extends between a mounting side 116 and an opposite top side 118. The mounting side 116 is mounted to the side 106 of the PV module 104. In the illustrated embodiment, the mounting side 116 is mounted to the side 106 while being separated from the side 106 by a gasket 120. The gasket 120 is disposed between the housing 114 and the PV module 104 to provide a seal at an interface between the mounting side 116 of the housing 114 and the side 106 of the PV module 104. The gasket 120 may be an elastomeric body that is compressed between the housing 114 and the PV module 104 when the connector assembly 102 is mounted to the PV module 104. Alternatively, the gasket 120 may be a body having an adhesive on one or more sides. For example, the gasket 120 may be a peel-and-stick two-sided adhesive that is affixed to the PV module 104 on one side and to the mounting side 116 on another side. The gasket 120 may hold the housing 114 in place relative to the PV module 104. The gasket 120 prevents ingress of moisture, debris, and the like into the interface between the mounting side 116 of the housing 114 and the side 106 of the PV module 104.

In the illustrated embodiment, a pair of cables 112 extends from the housing 114. While only two cables 112 are shown in FIG. 1, alternatively a different number of cables 112 may be provided. The cables 112 include one or more conductors (not shown) that are electrically coupled with the contacts 506 (shown in FIG. 5) in the housing 114 of the connector assembly 102. The electric potential and/or current generated by the PV module 104 may be transmitted to the cables 112 via the contacts 506. The cables 112 may mate with one or more other connectors (not shown) or devices (not shown) to transmit the electric potential and/or current from the PV module 104 to the other connectors or devices. For example, the cables 112 include plug ends 122, 124 that may mate with the other connectors or devices.

Figure 2:
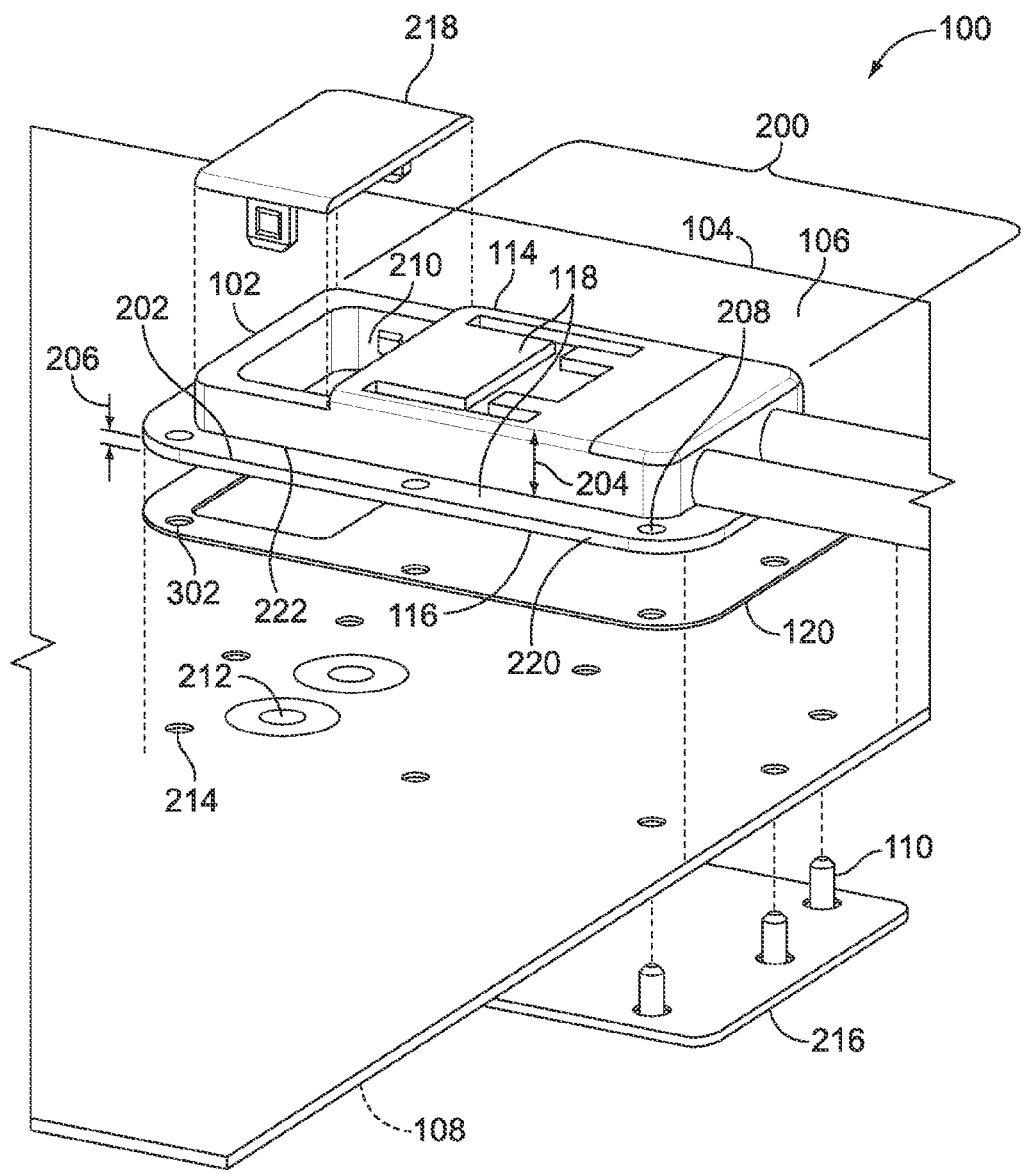
FIG. 2 is an exploded view of the PV connector system in accordance with one embodiment of the present disclosure.

FIG. 2 is an exploded view of the system 100 in accordance with one embodiment of the present disclosure. The housing 114 of the connector assembly 102 includes a main body 200 and a flange 202. The main body 200 and flange 202 may be a unitary body. For example, the main body 200 and flange 202 may be molded from a dielectric material, such as a polymer. Alternatively, the main body 200 and the flange 202 may be separately formed or fabricated from one another and joined with each other. In the illustrated embodiment, the flange 202 outwardly extends from the main body 200 along an outer periphery 222 of the main body 200. The flange 202 may continuously extend around the outer periphery 222 of the main body 200. For example, the flange 202 may be disposed around the perimeter of the main body 200 without any gaps or separations in an edge 220 extending along the outer perimeter or periphery of the flange 202. In another embodiment, the flange 202 may include one or more gaps, spaces, separations, and the like that forms a non-continuous flange 202.

The main body 200 and flange 202 may have different thickness dimensions 204, 206. As shown in FIG. 2, the flange 202 may have a smaller thickness dimension 206 throughout the flange 202 that is smaller than the thickness dimension 204 of the main body 200. The thickness dimension 206 of the flange 202 may be approximately constant throughout the flange 202. In the illustrated embodiment, the thickness dimension 206 of the flange 202 is smaller than the smallest thickness dimension 204 of the main body 200. The thickness dimensions 204, 206 may be measured in a direction that is perpendicular to the mounting side 116 of the housing 114.

The flange 202 includes the openings 208 disposed around the outer periphery of the main body 200. While the illustrated embodiment includes eight openings 208 in the connector assembly 102, a different number of openings 208 may be provided. The openings 208 may be evenly distributed in the flange 202 around the perimeter of the main body 200. Alternatively, two or more of the openings 208 may be grouped closer together than other openings 208. The openings 208 extend through the housing 114. For example, the openings 208 extend from the mounting side 116 to the opposite side 118 of the flange 202. In another embodiment, one or more of the openings 208 may be disposed in the main body 200. For example, the housing 114 may not include the flange 202 and have the openings 208 extend through the main body 200.

The housing 114 frames a contact window 210 that establishes an opening extending through the housing 114. The contact window 210 may be an opening extending from the mounting side 116 to the opposite side 118 of the main body 200 of the housing 114. The contacts 506 (shown in FIG. 5) protrude from the housing 114 into the contact window 210. The contacts 506 are electrically joined with the PV module 104 within the contact window 210. For example, the PV module 104 may include conductive terminals 212 disposed on the side 106 of the PV module 104. As described below, the contacts 506 are electrically coupled with the conductive terminals 212 to permit transmission of electric potential and/or current from the PV module 104 to the contacts 506. A window cover 218 may be placed over the contact window 210 to enclose the contacts 506 in the contact window 210. In one embodiment, the volume enclosed by the contact window 210 between the PV module 104 and the window cover 218 may be partially or completely filled with an encapsulating material, such as a potting material. The encapsulating material may protect the contacts 506 from foreign materials and objects, such as moisture.

Figure 3:
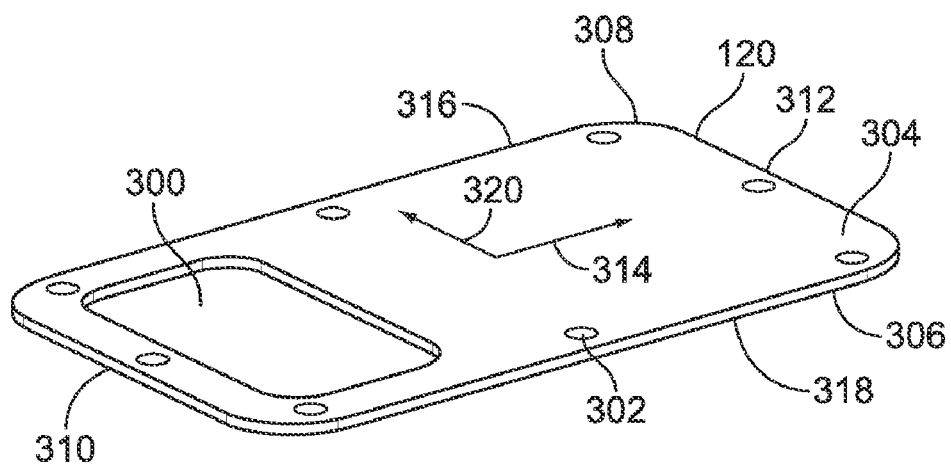
FIG. 3 is a perspective view of an elastomeric gasket shown in FIG. 1 in accordance with one embodiment of the present disclosure.

FIG. 3 is a perspective view of the gasket 120 in accordance with one embodiment of the present disclosure. The gasket 120 is an approximately planar body extending between opposite sides 304, 306 in the illustrated embodiment. Alternatively, the gasket 120 may include ribs. The sides 304, 306 extend between opposite edges 310, 312 along a longitudinal direction 314 and between opposite edges 316, 318 along a lateral direction 320. The edges 310, 312, 316, 318 define an outer edge 308 of the gasket 120. In the embodiment shown in FIG. 3, the majority of the area extending between the edges 310, 312 and between the edges 316, 318 is encompassed by the body of the gasket 120. For example, the majority of the area within the area bounded by the edges 310, 312, 316, 318 may include the planar body of the gasket 120, with a connection opening 300 and the openings 302 being the only open spaces devoid of the body of the gasket 120 within the area bounded by the edges 310, 312, 316, 318. The relatively large surface area that is encompassed by the gasket 120 may assist in filling voids and/or gaps between the housing 114 and the PV module 104. Filling such voids and/or gaps may prevent ingress of moisture and other contaminants into the space between the housing 114 and the PV module 104.

The gasket 120 may be a unitary elastomeric body. For example, the gasket 120 may be molded from an elastic polymer. For example, the gasket 120 may be elastic such that the gasket 120 expands in at least one direction that is oriented parallel to the side 106 (shown in FIG. 1) of the PV module 104 and/or the mounting side 116 (shown in FIG. 1) of the housing 114 (shown in FIG. 1) when the gasket 120 is compressed between the housing 114 and the PV module 104 in a direction oriented perpendicular to the mounting side 116 of the housing 114 and/or the side 106 of the PV module 104.

The connection opening 300 extends through the gasket 120. The connection opening 300 provides access or clearance for the contacts 506 (shown in FIG. 5) to be electrically coupled with the conductive terminals 212 (shown in FIG. 2) of the PV module 104 (shown in FIG. 1). For example, the gasket 120 may be positioned between the housing 114 (shown in FIG. 1) and the PV module 104 such that the conductive terminals 212 are located within or are accessible through the connection opening 300 in the gasket 120. As described below, the contacts 506 and conductive terminals 212 may be electrically joined by positioning a conductive body between the contacts 506 and conductive terminals 212 that extends through the connection opening 300.

The outer edge 308 of the gasket 120 may be approximately coextensive with the mounting side 116 (shown in FIG. 1) of the housing 114 (shown in FIG. 1) when the gasket 120 is disposed between the housing 114 and the PV module 106 (shown in FIG. 1). For example, the outer edge 308 of the gasket 120 may be approximately the same size as the outer perimeter or periphery of the flange 202 (shown in FIG. 2) of the housing 114. In one embodiment, the surface area of the side 304 may be approximately the same as the surface area of the mounting side 116 of the housing 114 such that the gasket 120 is coextensive with and covers the mounting side 116 when the housing 114 is mounted to the PV module 104 (shown in FIG. 1) and the gasket 120 is located between the housing 114 and the PV module 104. Alternatively, the sides 304, 306 may be smaller than or larger than the mounting side 116 of the housing 114. For example, the connection opening 300 may be larger than an opening 502 (shown in FIG. 5) defined by the contact window 210 (shown in FIG. 2) of the housing 114 at the mounting side 116. The larger connection opening 300 may result in the gasket 120 encompassing a smaller surface area than the mounting side 116 of the housing 114.

The openings 302 extend through the gasket 120. While eight openings 302 are shown in FIG. 3, alternatively a different number of the openings 302 may be provided. The openings 302 are disposed along the outer perimeter or periphery of the gasket 120. For example, the openings 302 may be evenly dispersed along or near the outer boundary or edge of the gasket 120.

The gasket 120 may provide a seal that prevents ingress of foreign objects and moisture into the space between the housing 114 (shown in FIG. 1) of the connector assembly 102 (shown in FIG. 1) and the side 106 (shown in FIG. 1) of the PV module 104 (shown in FIG. 1). For example, the gasket 120 may be partially compressed between the housing 114 and the PV module 104 and provide a seal at the interface between the mounting side 116 (shown in FIG. 1) of the housing 114 and the side 106 of the PV module 104. The seal provided by the gasket 120 may protect the contacts 506 (shown in FIG. 5) in the contact window 210 (shown in FIG. 2) of the housing 114 from moisture, dirt, and other contaminants that may impact the electric potential and/or current conveyed between the PV module 104 and the contacts 506 within the contact window 210.

Figure 4:
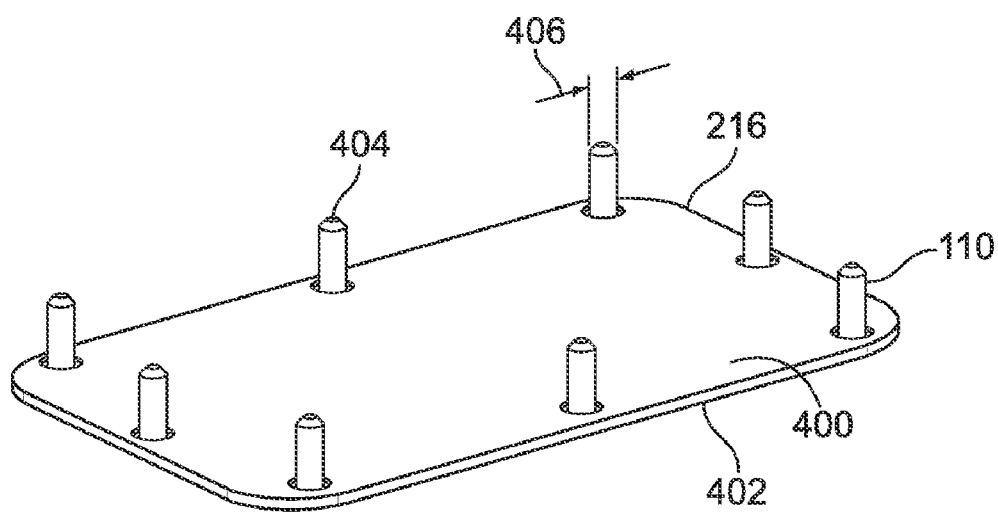
FIG. 4 is a perspective view of a support plate shown in FIG. 2 in accordance with one embodiment of the present disclosure.

FIG. 4 is a perspective view of the support plate 216 in accordance with one embodiment of the present disclosure. The support plate 216 is an approximately planar body extending between opposite sides 400, 402. The posts 110 protrude from the side 400 in directions that are perpendicular to the side 400 in the illustrated embodiment. The posts 110 extend from the side 400 to outer ends 404. In one embodiment, the support plate 216 is shown in FIG. 4 prior to securing the support plate 216 to the housing 114 (shown in FIG. 1) of the connector assembly 102 (shown in FIG. 1). For example, the posts 110 are shown with an approximately constant outer diameter 406 between the side 400 and the outer ends 404. As described below, the outer ends 404 may be riveted or otherwise modified in shape to alter the outer diameters 406 of the outer ends 404 after the support plate 216 is joined to the housing 114.

The support plate 216 may be a unitary body. For example, the support plate 216 including the posts 110 may be a dielectric material, such as one or more polymers, that are molded as a single piece body. Alternatively, the support plate 216 and posts 110 may be a conductive material, such as a metal or metal alloy, that is stamped and formed as a single piece body.

Returning to the exploded view of the system 100 shown in FIG. 2, the PV module 104 includes several openings 214 that may be aligned with the openings 208 in the housing 114 and the openings 302 of the gasket 120 along directions that are oriented perpendicular to the mounting side 116 of the housing 114. While eight openings 214 are shown in FIG. 2, the number of openings 214 may be different. The openings 208, 214, 302 in the housing 114, the PV module 104, and the gasket 120 may be aligned with one another in order to receive the posts 110 of the support plate 216. For example, the housing 114, PV module 104, and gasket 120 may be positioned such that the openings 208, 214, 302 are aligned with one another in directions oriented perpendicular to the support plate 216. The gasket 120 may be placed onto the PV module 104 with the housing 114 placed onto the gasket 120. The posts 110 of the support plate 216 are loaded into the openings 214 of the PV module 104 through the bottom side 108 of the PV module 104. The posts 110 extend through PV module 104, gasket 120, and housing 114 via the openings 214, 302, 208.

Figure 5:
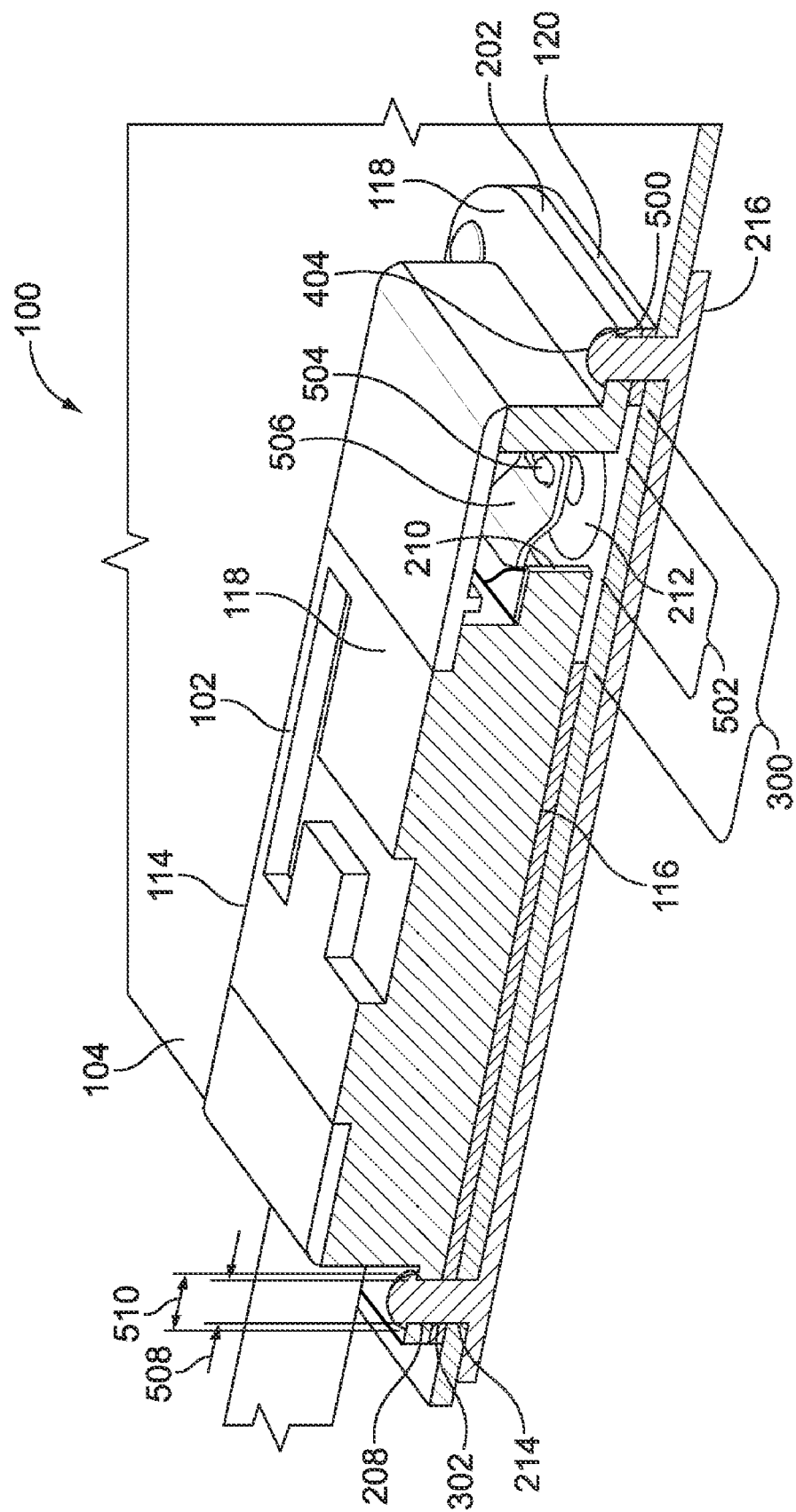
FIG. 5 is a cross-sectional view of the PV connector system taken along line 5-5 shown in FIG. 1 in accordance with one embodiment of the present disclosure.

FIG. 5 is a cross-sectional view of the system 100 taken along line 5-5 shown in FIG. 1 in accordance with one embodiment of the present disclosure. The system 100 is shown with the support plate 216 coupled with the housing 114 and the gasket 120 disposed between the housing 114 and the PV module 104. The support plate 216 may be joined to the housing 114 to secure the housing 114 to the PV module 104. In the illustrated embodiment, the support plate 216 is secured to the housing 114 by altering the shape of the posts 110 after the posts 110 are loaded through the openings 214, 302, 208 in the PV module 104, gasket 120, and housing 114. For example, the outer ends 404 of the posts 110 may be partially flattened such that an outer diameter dimension 510 of the posts 110 above the side 118 of the housing 114 on the flange 202 is larger than an inside diameter dimension 508 of the openings 208 in the housing 114. The diameter dimensions 508, 510 may be measured in directions that are parallel to the mounting side 116 of the housing 114. In one embodiment, the outer diameter dimension 510 of the outer end 404 is the largest dimension 510 of the post 110 in directions that are parallel to the mounting side 116. The outer ends 404 may be partially flattened into cap-like shapes shown in FIG. 5. The outer ends 404 of the posts 110 may be partially flattened using a staking process, such as an ultrasonic- or heat-staking process. In one embodiment, the shapes and dimensions of the outer ends 404 are modified to form caps similar to the caps described as the caps 84 in the '658 Application.

For example, the outer ends 404 may be modified to form rivet heads similar to the buck-tail of a mechanical rivet fastener. As shown in FIG. 5, the outer ends 404 may be partially flattened such that the outer ends 404 form a pan head having a flat surface 500 that engages the side 118 of the flange 202 of the housing 114. The riveted or partially flattened outer ends 404 secure the support plate 216 to the housing 114 and may prevent the housing 114 from being removed from the PV module 104. The posts 110 and outer ends 404 may secure the housing 114 to the PV module 104 to prevent the gasket 120 from being removed from between the housing 114 and the PV module 104. Alternatively, the posts 110 may be coupled to the housing 114 using an adhesive. For example, an adhesive may be applied to the outer ends 404 to secure the posts 110 to the housing 114.

In an alternative embodiment, the posts 110 may be coupled with the housing 114 and extend through openings 302, 214 in the gasket 120 and the PV module 104 to be received in openings (not shown) in the support plate 216. For example, the housing 114 and posts 110 may be molded as a unitary body. The outer ends 404 of the posts 110 may then be modified as described above to secure the posts 110 to the support plate 216 and secure the housing 114 to the PV module 104.

As described above and shown in FIG. 5, the gasket 120 seals the opening 502 defined by the contact window 210 at the mounting side 116 of the housing 114. The gasket 120 surrounds the opening 502 at the mounting side 116 to prevent ingress of moisture into the contact window 210. The connection opening 300 in the gasket 120 may be aligned with the opening 502 of the mounting side 116 to permit coupling of the contacts 506 of the connector assembly 102 with the conductive terminals 212 of the PV module 104 through the connection opening 300.

A conductive body 504 is shown schematically in FIG. 5 as coupling the contacts 506 of the connector assembly 102 and the conductive terminals 212 of the PV module 104. The conductive body 504 may include a conductive solder or other component that includes, or is formed from, a conductive material, such as a metal or metal alloy. The conductive body 504 is placed between the contacts 506 and the conductive terminals 212 to establish an electrically conductive pathway therebetween for the transmission of electric potential and/or current between the PV module 104 and the contacts 506.

Figure 6:
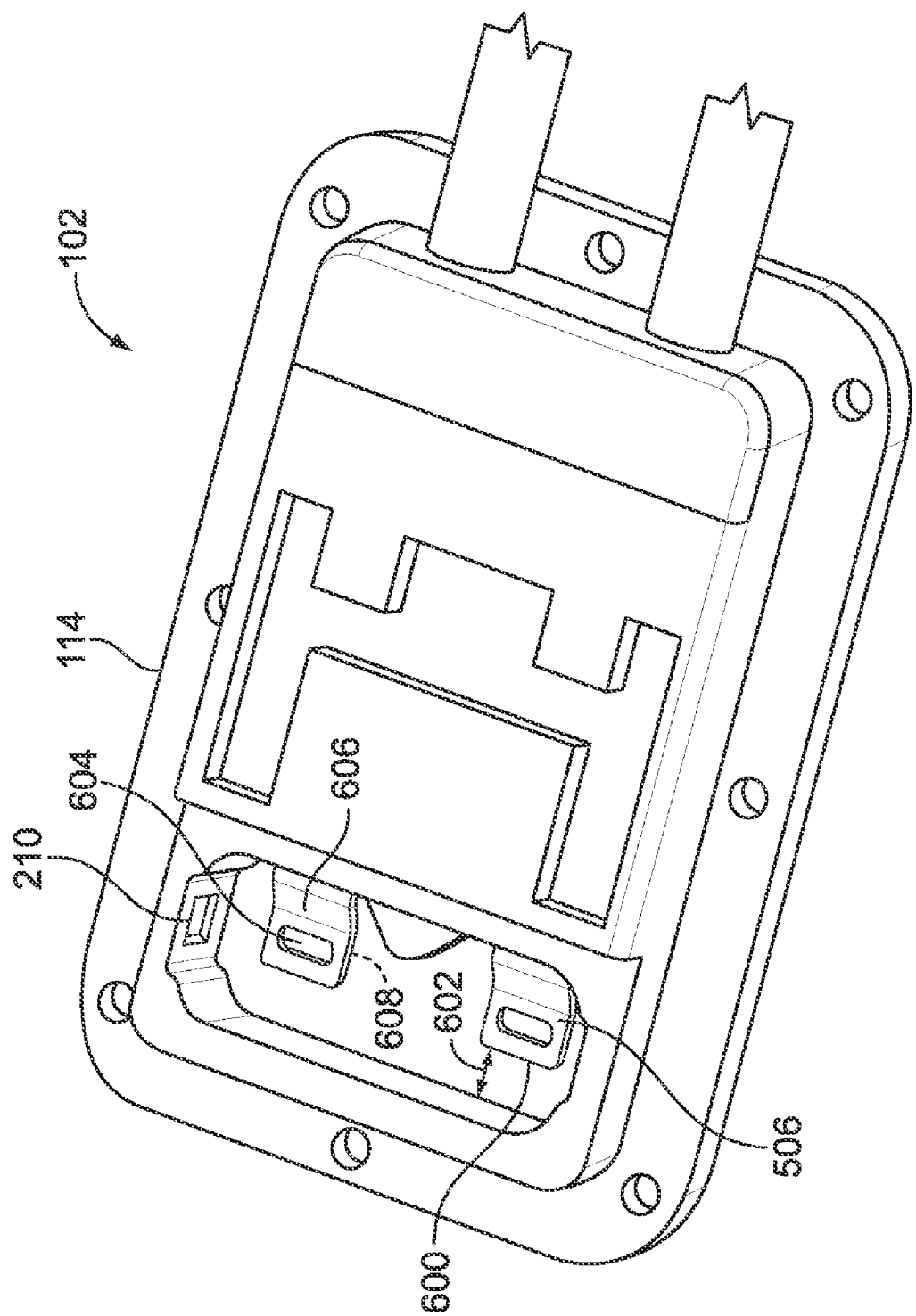
FIG. 6 is a perspective view of the connector assembly shown in FIG. 1 in accordance with one embodiment of the present disclosure.

FIG. 6 is a perspective view of the connector assembly 102 in accordance with one embodiment of the present disclosure. The connector assembly 102 is shown in FIG. 6 with the window cover 218 (shown in FIG. 2) removed. The contacts 506 are held in the housing 114 of the connector assembly 102. While two contacts 506 are shown in FIG. 6, alternatively a different number of contacts 506 may be provided. The contacts 506 extend from the housing 114 into the contact window 210. The contacts 506 protrude from the housing 114 to corresponding outer ends 600. The outer ends 600 are separated from the housing 114 by a spatial gap 602 in the illustrated embodiment.

The contacts 506 may be formed as approximately planar bodies of a conductive material, such as a metal or metal alloy. The contacts 506 extend between opposite sides 606, 608. In the illustrated embodiment, a connection opening 604 is provided in each of the contacts 506. The connection opening 604 extends through the contact 506 from one side 606 to the other side 608. The connection opening 604 may be surrounded by the contact 506 around the outer perimeter or periphery of the connection opening 604 between the sides 606, 608. For example, the connection opening 604 may extend through a middle or interior portion of the contact 506 as shown in FIG. 6.

The conductive body 504 may be disposed in the connection opening 604. For example, a conductive solder may be deposited into the connection opening 604. The connection opening 604 provides an easy to see and clear opening or target into which the conductive body 504 may be placed to ensure an electrical connection between the contacts 506 and the PV module 104. As described above, the opening 300 (shown in FIG. 3) of the gasket 120 (shown in FIG. 1) may provide an opening through which the contacts 506 and the conductive terminals 212 (shown in FIG. 2) of the PV module 104 may be electrically joined. For example, the conductive body 504 may flow through the connection opening 604 and pass through the opening 300 in the gasket 120 to be deposited onto or come into mechanical contact with the conductive terminals 212 of the PV module 104. A conductive solder may be deposited onto the conductive terminals 212 through the connection openings 604 until the solder extends between the conductive terminals 212 and the bottom side 608 of the contacts 506. The conductive body 504 extends between the conductive terminals 212 and the contacts 506 to electrically couple the PV module 104 with the contacts 506.

Alternatively, the PV module 104 (shown in FIG. 1) may include a bus bar (not shown) or other electrical connection that is electrically coupled with the contacts 506. For example, a bus bar of the PV module 104 may extend from the side 106 (shown in FIG. 1) of the PV module 104 and be crimped onto or soldered to the sides 606 and/or the sides 608 of the contacts 506. The conductive body 504 (shown in FIG. 5) may be used to electrically couple the bus bar with the contacts 506 by depositing the conductive body 504 into the connection opening 604 of the contacts 506 and affixing the bus bar to the contacts 506. In another embodiment, the contacts 506 do not include the connection openings 604 and the bus bar is soldered to the side 606 and/or side 608.

Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A connector assembly comprising:
a housing extending between a mounting side and an opposite side, the mounting side configured to be mounted to a first side of a photovoltaic module, the housing including a first opening that extends through the housing and is encircled by the housing;
a contact held by the housing and configured to be electrically coupled with the photovoltaic module; and
a support plate configured to be mounted to a second side of the photovoltaic module, the support plate including a post extending through a second opening in the photovoltaic module that extends therethrough and through the first opening in the housing, wherein the post is received in the first opening of the housing and secures the housing to the photovoltaic module.

2. The connector assembly of claim 1, wherein the housing comprises a flange that outwardly extends from the housing, the flange comprising the first opening through which the post extends.

3. The connector assembly of claim 1, wherein the post comprises an outer end having an outer diameter dimension that is greater than an inside diameter dimension of the first opening.

4. The connector assembly of claim 1, further comprising an elastomeric gasket disposed between the mounting side of the housing and the first side of the photovoltaic module, the gasket having an outer edge that is approximately coextensive with an outer edge of the mounting side of the housing.

5. The connector assembly of claim 4, wherein the housing comprises a contact window extending through the housing between the mounting side and the opposite side with the contact protruding from the housing into the contact window, further wherein the gasket includes a third opening aligned with the contact window.

6. The connector assembly of claim 1, wherein the contact extends between opposite sides and includes a connection opening extending through the contact from one of the opposite sides to the other of the opposite sides.

7. The connector assembly of claim 6, wherein the contact in the housing receives a conductive body of the photovoltaic module.

8. The connector assembly of claim 1, wherein the first opening in the housing is encircled by the housing such lateral movement of the support plate relative to the housing is prevented.

9. The connector assembly of claim 4, wherein the gasket includes a third opening aligned with the first and second openings such that the post extends through the second opening in the photovoltaic module, the third opening in the gasket, and the first opening in the housing.

10. A connector assembly comprising:
a housing extending between a mounting side and an opposite side, the mounting side configured to be mounted to a first side of a photovoltaic module, the housing including a contact window that frames an opening extending through the housing from the mounting side to the opposite side;
a cable coupled with the housing, the cable including a conductor capable of transferring at least one of electric current or electric potential generated by the photovoltaic module;
a contact joined with the housing and protruding into the contact window, the contact electrically coupled with the conductor of the cable and having opposite sides with a connection opening extending therethrough, wherein the contact is electrically coupled with the photovoltaic module when a conductive body of the photovoltaic module is loaded into the connection opening of the contact; and
a support plate configured to be mounted to a second side of the photovoltaic module, the support plate or the housing includes a post and the other of the support plate or the housing includes a first opening, the post extending through a second opening in the photovoltaic module and received in the first opening, wherein the support plate and the housing are prevented from laterally moving relative to each other by the post received in the first opening.

11. The connector assembly of claim 10, wherein the contact is electrically coupled with the photovoltaic module when a conductive solder is loaded into the connection opening of the contact.

12. The connector assembly of claim 10, wherein the post comprises an outer end having an outer diameter dimension that is greater than an inside diameter dimension of the first opening in the housing or the support plate.

13. The connector assembly of claim 10, further comprising an elastomeric gasket disposed between the mounting side of the housing and the photovoltaic module, the gasket preventing ingress of moisture into an interface between the housing and the photovoltaic module.

14. The connector assembly of claim 10, further comprising a gasket adapted to be disposed between the housing and the photovoltaic module, the gasket having an outer edge that is approximately coextensive with an outer edge of the mounting side of the housing and a third opening through which the post extends.

15. A connector assembly comprising:
a housing extending between a mounting side and an opposite side, the mounting side surrounded by an outer edge and configured to be mounted to a first side of a photovoltaic module;
a support plate configured to be mounted to a second side of the photovoltaic module, the housing or the support plate including a post and the other of the housing or the support plate including a first opening that is encircled by the housing or the support plate, the post preventing lateral movement of the support plate relative to the housing when the post extends through a second opening in the photovoltaic module and is received in the first opening of the housing or the support plate;

a contact joined with the housing and configured to be electrically coupled with the photovoltaic module;

an elastomeric gasket having a body with an outer edge disposed between the mounting side of the housing and the photovoltaic module, the outer edge of the gasket being approximately coextensive with the outer edge of the mounting side of the housing, wherein the gasket includes a third opening that is axially aligned with the first and second openings such that the post extends through the first, second, and third openings.

16. The connector assembly of claim 15, wherein the housing includes a contact window that frames a fourth opening extending through the housing and the gasket includes a fifth opening extending therethrough that is aligned with the contact window.

17. The connector assembly of claim 16, wherein the contact extends from the housing into the contact window and is electrically coupled with the photovoltaic module through the fifth opening in the gasket.

18. The connector assembly of claim 15, wherein the gasket prevents ingress of moisture between an interface between the housing and the photovoltaic module.

19. The connector assembly of claim 15, wherein the contact includes a planar conductive body having opposite sides with a connection opening extending therethrough.

20. The connector assembly of claim 10, wherein the first opening is encircled by the housing or the support plate.

* * * * *